United States Patent
Li et al.

(10) Patent No.: US 9,576,037 B2
(45) Date of Patent: Feb. 21, 2017

(54) SELF-ANALYZING DATA PROCESSING JOB TO DETERMINE DATA QUALITY ISSUES

(71) Applicant: International Business Machines Corporation, Armonk, NY (US)

(72) Inventors: Jeff J. Li, Boca Raton, FL (US); Yong Li, Newton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 14/224,864

(22) Filed: Mar. 25, 2014

(65) Prior Publication Data

US 2014/0279835 A1    Sep. 18, 2014

Related U.S. Application Data

(63) Continuation of application No. 13/833,860, filed on Mar. 15, 2013.

(51) Int. Cl.
G06F 7/00 (2006.01)
G06F 17/00 (2006.01)
G06F 17/30 (2006.01)

(52) U.S. Cl.
CPC ... *G06F 17/30563* (2013.01); *G06F 17/30303* (2013.01)

(58) Field of Classification Search
CPC ............ G06F 17/30067; G06F 17/30286; G06F 11/1435; G06F 17/30864; H03M 7/30
USPC .......................................................... 707/687
See application file for complete search history.

(56) References Cited

U.S. PATENT DOCUMENTS

| | | | |
|---|---|---|---|
| 5,050,088 A * | 9/1991 | Buckler et al. | 700/96 |
| 7,296,017 B2 | 11/2007 | Larcheveque et al. | |
| 7,720,804 B2 * | 5/2010 | Fazal et al. | 707/601 |
| 7,747,945 B1 | 6/2010 | Babka et al. | |
| 7,756,873 B2 | 7/2010 | Gould et al. | |
| 8,046,385 B2 | 10/2011 | Wald et al. | |
| 8,219,520 B2 | 7/2012 | Li et al. | |
| 2005/0114369 A1 | 5/2005 | Gould et al. | |
| 2005/0182739 A1 | 8/2005 | Dasu et al. | |
| 2007/0282864 A1* | 12/2007 | Parees | G06Q 10/06 |
| 2008/0307262 A1 | 12/2008 | Carlin, III | |

(Continued)

OTHER PUBLICATIONS

Kiel, Paul, Profiling XML Schema, XML.com, Sep. 20, 2006, retrieved Mar. 19, 2013, <http://www.xml.com/lpt/a/1673>.

(Continued)

*Primary Examiner* — Augustine K Obisesan
*Assistant Examiner* — Lin Lin Htay
(74) *Attorney, Agent, or Firm* — Patterson + Sheridan, LLP

(57) ABSTRACT

Techniques are disclosed to determine data quality issues in data processing jobs. The data processing job is received, the data processing job specifying one or more processing steps designed based on one or more data schemas and further specifies one or more desired quality metrics to measure at the one or more processing steps. One or more state machines are provided, that are generated based on the quality metrics and on the data schemas. Input data to the data process job are processed using the one or more state machines, in order to generate output data and a set of data quality records characterizing a set of data quality issues identified during the execution of the data processing job.

20 Claims, 7 Drawing Sheets

(56) References Cited

U.S. PATENT DOCUMENTS

| | | |
|---|---|---|
| 2009/0112753 A1* | 4/2009 | Gupta et al. .................... 705/38 |
| 2009/0319566 A1* | 12/2009 | Wald ................. G06F 17/30303 |
| 2011/0099559 A1* | 4/2011 | Kache et al. ................ 719/318 |
| 2012/0310875 A1 | 12/2012 | Prahlad et al. |
| 2013/0055042 A1* | 2/2013 | Al Za'Noun et al. ........ 714/746 |

OTHER PUBLICATIONS

U.S. Appl. No. 13/833,860, entitlted "Self-Analyzing Data Processing Job to Determine Data Quality Issues", filed Mar. 15, 2013.

\* cited by examiner

US 9,576,037 B2

SELF-ANALYZING DATA PROCESSING JOB TO DETERMINE DATA QUALITY ISSUES

CROSS-REFERENCE TO RELATED APPLICATION

This application is a continuation of co-pending U.S. patent application Ser. No. 13/833,860, filed Mar. 15, 2013. The aforementioned related patent application is herein incorporated by reference in its entirety.

BACKGROUND

Field

Embodiments disclosed herein relate to data processing. More specifically, embodiments disclosed herein relate to determining data quality issues in data processing jobs.

Description of the Related Art

A data warehouse may often include a collection of data designed to support management decision making. Such data warehouses may contain a wide variety of data processing jobs intended to support development of management reports or data mining models depicting business conditions at a particular point in time. Data warehouse systems include systems to extract data from business applications and a warehouse database system to which the extracted data is transferred and loaded in an organized fashion so as to provide business managers useful and efficient access to the data. Data warehouses generally combine data extracted from many different databases across an entire enterprise. The data processing requirements of extracting data from many databases, transferring it across an enterprise, and loading it meaningfully into a data warehouse may often be demanding.

SUMMARY

Embodiments presented in this disclosure provide a computer-implemented method to determine data quality issues in data processing jobs. The method includes receiving a data processing job specifying one or more processing steps designed based on one or more data schemas and further specifying one or more desired quality metrics to measure at the one or more processing steps. The method also includes providing one or more state machines generated based on the quality metrics and on the data schemas. The method also includes processing input data for the data processing job using the one or more state machines in order to generate output data for the data processing job and a set of data quality records characterizing a set of data quality issues identified during execution of the data processing job. The method also includes outputting the generated set of data quality records.

Other embodiments presented in this disclosure provide a computer program product to determine data quality issues in data processing jobs. The computer program product includes a computer-readable storage medium having program code embodied therewith. The program code is executable by one or more computer processors to receive a data processing job specifying one or more processing steps designed based on one or more data schemas and further specifying one or more desired quality metrics to measure at the one or more processing steps. The program code is also executable to provide one or more state machines generated based on the quality metrics and on the data schemas. The program code is also executable to process input data for the data processing job using the one or more state machines in order to generate output data for the data processing job and a set of data quality records characterizing a set of data quality issues identified during execution of the data processing job. The program code is also executable to output the generated set of data quality records.

Still other embodiments presented in this disclosure provide a system to determine data quality issues in data processing jobs. The system includes one or more computer processors and a memory containing a program which, when executed by the one or more computer processors, is configured to perform an operation that includes receiving a data processing job specifying one or more processing steps designed based on one or more data schemas and further specifying one or more desired quality metrics to measure at the one or more processing steps. The operation also includes providing one or more state machines generated based on the quality metrics and on the data schemas. The operation also includes identifying a repository handle of the stored data unit. The operation also includes processing input data for the data processing job using the one or more state machines in order to generate output data for the data processing job and a set of data quality records characterizing a set of data quality issues identified during execution of the data processing job. The operation also includes outputting the generated set of data quality records.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
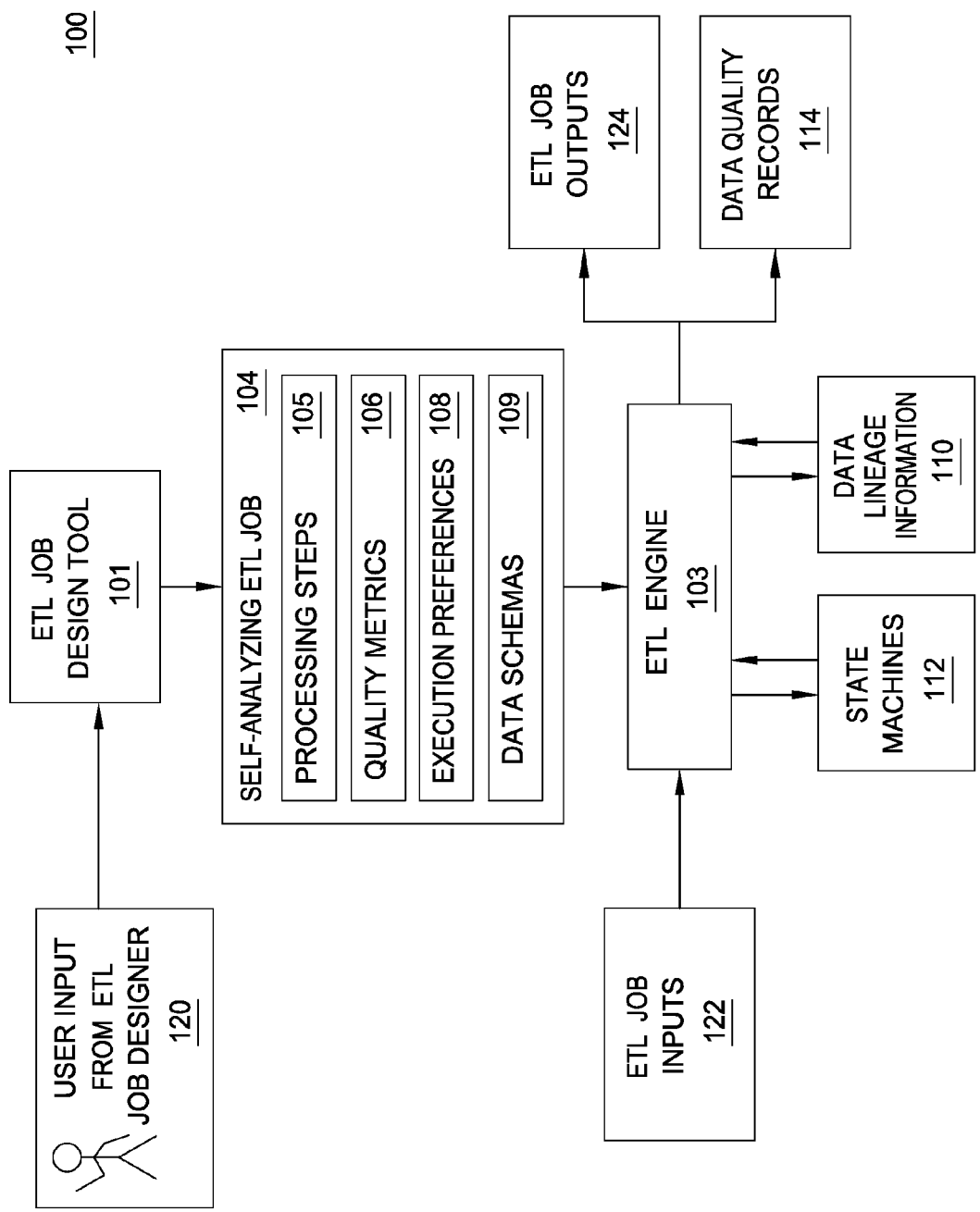
FIG. 1A-1B are block diagrams illustrating components of a system configured to determine data quality issues in data processing jobs, according to one embodiment presented in this disclosure.

Data processing jobs may often be used to process data in various formats, such as relational data, Extended Markup Language (XML) data, JavaScript Object Notation (JSON) data, etc. One example of a data processing job is an Extract, Transform and Load (ETL) job. An example use case of an ETL job is in data warehousing. Data warehouse systems may often carry out ETL processing jobs to populate data warehouse tables. In order to populate the data warehouse tables properly, the execution of these steps may often be linked in a predefined order. Data warehouse systems may include a warehouse scheduler, also referred to as an ETL scheduler, configured to start execution of a first ETL step, whereafter execution of the remaining steps is followed according to a predetermined sequence. The ETL scheduler typically reads the steps from a fixed schedule and calls external programs in sequence according to the schedule.

At least in some cases, ETL processes, also referred to as ETL jobs, are an example of data processing jobs and are generally used in data integration applications to integrate data from at least two different sources. For instance, such data integration applications may be used to integrate data of different companies in case of mergers and acquisitions, or when data from different departments inside one company has to be integrated. The ETL processes may include a set of stages that involve operating on the data. The stages are connected via links, so that the entire ETL process forms a data flow graph from a source stage, where the data is loaded, to a target stage, where the data is stored. Between the source stage and the target stage, the data may be processed, joined, sorted, de-duplicated, combined, passed through or transformed in any way. The data itself may be represented in the form of records, which may contain—as individual data elements—a set of distinct columns. Individual steps of the processing of the data from the source to the target may be performed in a parallel implementation, such as on multiple processors of a single hardware platform or on multiple hardware platforms connected via a network such as cluster or computer grid. Such distributed execution may be implemented by design tools for ETL processes. At least in some cases, the design tools may automatically implement parallel processing without any user-provided configuration.

In ETL processes, storage of sources and targets, as well as the processing of data, may be distributed. A source database may be distributed over different network locations, the processing of the source data being separated into a set of stages, where each stage may be performed individually on a respective physical system. For instance, in some embodiments, each stage may be performed on a distinct physical system, while in other embodiments, one or more stages may be performed on the same physical system. Likewise, a target database may be distributed over different physical systems, the systems being different from the systems of the source database at least in some cases. A given, single stage of the processing may also be implemented in parallel to be executed on multiple cores or processors of a single computer or on multiple computers. Further, depending on the embodiment, the data may be any of a variety of predefined data types, such as relational data, hierarchical data, etc. Data of a given data type may be represented in any of a variety of predefined schemas, also referred to herein as formats. For example, hierarchical data may be stored according to formats such as Extended Markup Language (XML), JavaScript Object Notation (JSON), etc.

Regardless of the type or schema of the data involved in a data processing job, users of the data processing job may desire to process data and also troubleshoot the data processing job in order to identify and/or rectify data quality issues in the data. To that end, the users may desire to measure a level of data quality of the data.

For example, a user may design a data processing job to compose XML data from multiple inputs, including relational data from many different sources. The composing job will then take those inputs, and incorporate many incremental transformation steps, such as regroup, join, pivot etc. to form highly complex hierarchical output based on user specified schemas. The user may observe data quality issues in the generated XML data. Analyzing the data quality issues and identifying source data and transformation steps that contribute to the quality problem may be challenging and time-consuming in some cases.

As another example, another user may design a data processing job to parse a large amount of XML data received from different originating users and reject any data determined to be invalid. However, the data may be rejected as invalid upon determining a single data quality issue. At least in some cases, the user may desire detection of all, or at least multiple, data quality issues in the XML data. Doing so may allow the user to identify trends in the data quality issues and prioritize resolution of the data quality issues in collaboration with the originating users.

Accordingly, at least some embodiments disclosed herein provide techniques for detecting various data quality issues in data pertaining to a given data processing job. The data may include relational data, hierarchical data, streaming data, non-streaming data, etc. At least in some embodiments, the techniques take into account quality metrics, which may be specified by a user. Additionally or alternatively, the techniques may also identify any factors deemed as potentially causing a given data quality issue, also referred to herein as contributing factors. For instance, the techniques may identify which steps, components, job design artifacts, and data may potentially contribute to the data quality issue. The techniques may identify all, or at least multiple, data quality issues pertaining to a data processing job run. A data processing job configured according to the techniques herein may be referred to as a self-analyzing data processing job. One example of a self-analyzing data processing job is a self-analyzing ETL job.

Consequently, the techniques disclosed herein may facilitate expedient debugging and fixing of the data processing job at least in some cases—at least relative to alternative approaches of troubleshooting the data processing job. For instance, some alternative approaches do not take into account any user-specified data quality metrics in analyzing the data processing job. Other alternative approaches require job analysis to halt upon detecting only a single data quality issue as described above. Accordingly, such alternative approaches do not specify any total count of data quality issues existing in the data and further do not specify what types of data quality issues occur most significantly in the data. Still other alternative approaches do not specify what source data or processes pertain to an identified data quality issue. Others still perform relational data mining to identify relationships such as column data types, lengths, primary and foreign key relationships, etc. Such approaches support only relational data and do not support hierarchical data.

Figure 1B:
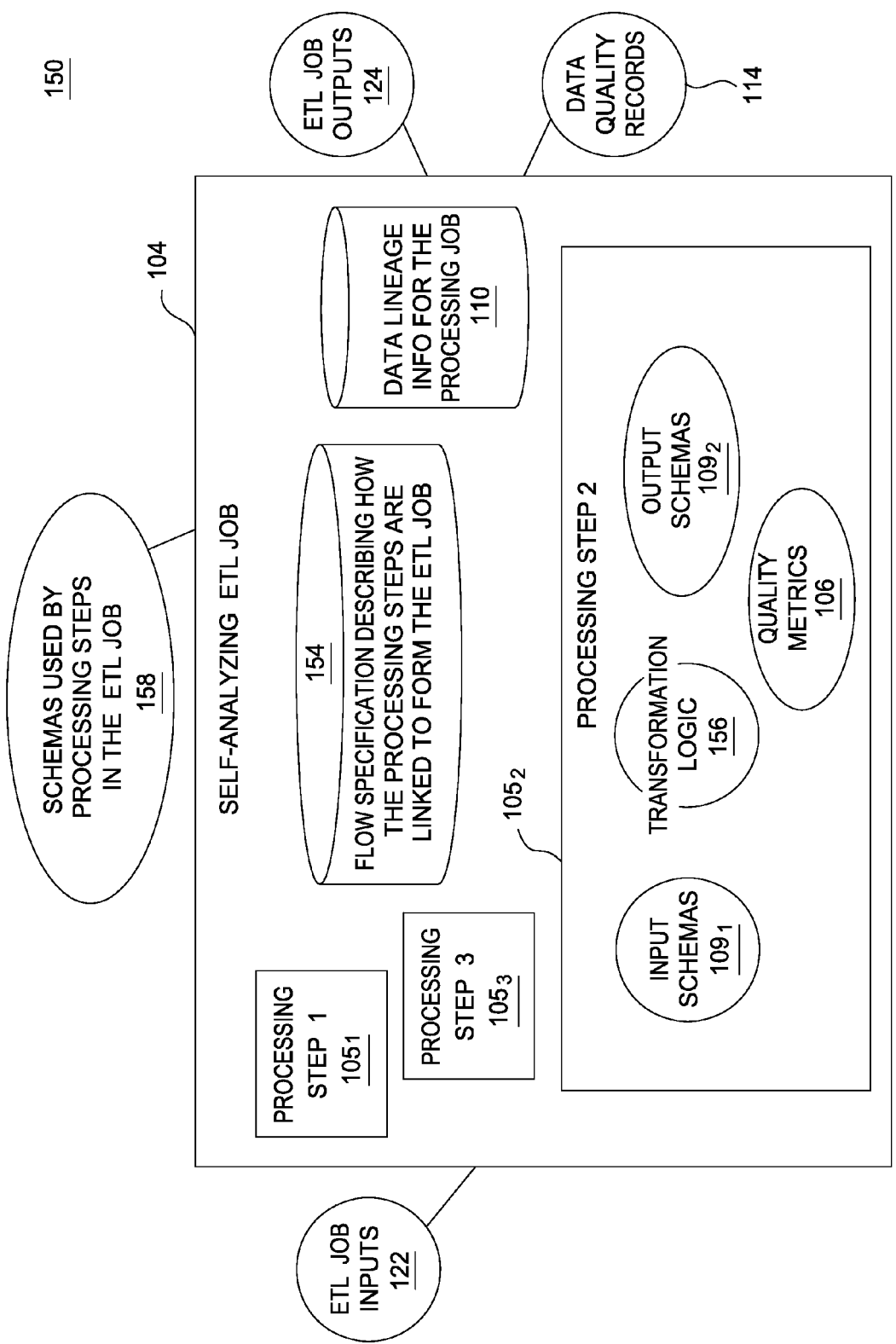

FIGS. 1A-1B are block diagrams 100, 150 illustrating components of a system configured to determine data quality issues in data processing jobs, according to one embodiment presented in this disclosure. As shown in FIG. 1A, the system includes an ETL job design tool 101, a self-analyzing ETL job 104, also referred to herein as an ETL job, and an ETL engine 103. In one embodiment, the ETL job design tool 101 is configured to generate the self-analyzing ETL job 104 based on user input 120, such as from an ETL job designer. The self-analyzing ETL job 104 includes processing steps 105, quality metrics 106 desired to be measured at each of the processing steps 105, execution preferences 108, and data schemas 109, also referred to herein as schemas. Depending on the embodiment, the self-analyzing ETL job may be a self-analyzing hierarchical data composing job or a self-analyzing hierarchical data parsing job. A hierarchical data composing job may be referred to herein as a hierarchical composing job or composing job, and a hierarchical data parsing job may be referred to herein as a hierarchical parsing job or parsing job.

In one embodiment, the quality metrics 106 and execution preferences 108 may be specified by a user such as the ETL job designer. In some embodiments, one or more of the quality metrics 106 and execution preferences 108 may be provided to the ETL engine 103, as part of the ETL job 104. In other embodiments, one or more of the quality metrics 106 and execution preferences 108 may be provided to the ETL engine 103, separate from and external to the ETL job 104.

In one embodiment, the self-analyzing ETL job 104 is configured to, when executed by the ETL engine 103, generate ETL job outputs 124 based on ETL job inputs 122. To that end, each processing step in the ETL job is configured to perform a respective transformation operation on the data originating from the ETL job inputs 122. For instance, a given processing step in the ETL job may process ETL job inputs 122 or, alternatively, intermediate outputs generated by one or more earlier processing steps in the ETL job. In one embodiment, the ETL engine 103 is configured to generate state machines 112. Each state machine 112 corresponds to a respective processing step in the ETL job. The self-analyzing ETL job 104 may then process incoming events in the data at each processing step using the respective state machine 112. Based on the processing and the received inputs, the ETL job 104 may then generate data quality records 114 characterizing data quality issues encountered while processing data. In some embodiments, the self-analyzing ETL job 104 also performs data lineage analysis on itself in order to generate data lineage information 110. In one embodiment, data lineage of given data refers to one or more sources of the given data. Depending on the embodiment, the data lineage information may additionally indicate how the given data has been transformed. Then the self-analyzing ETL job 104 may update the data quality records 114 with additional information based on the data lineage information 110. At least in some embodiments, the data quality records 114 may indicate, for each reported data quality issue, an indication of which steps, components, job design artifacts, and data may potentially contribute to the data quality issue.

At least in some embodiments, multiple data quality issues may be identified without requiring the self-analyzing ETL job to be re-submitted. For instance, the user designing the ETL job need not to troubleshoot and fix a previous data quality issue as a precondition for the ETL engine 103 identifying a single, next data quality issue in the ETL job upon resubmission of the ETL job to the ETL engine 103. Accordingly, using the data quality records 114, the user may debug and fix the ETL job more efficiently and/or conveniently at least in some cases.

As shown in FIG. 1B, the block diagram 150 includes the self-analyzing ETL job 104 of FIG. 1A. The self-analyzing ETL job 104 includes one or more processing steps $105_{1-3}$ and a flow specification 154, also referred to as an ETL data flow, indicating how the processing steps $105_{1-3}$ are linked to form the ETL job. In some embodiments, each processing step $105_{1-3}$ specifies input schemas, transformation logic, output schemas, and quality metrics. For example, the processing step $105_2$ specifies input schemas $109_1$, transformation logic 156, output schemas $109_2$, and quality metrics 106. As described above, in one embodiment, the self-analyzing ETL job 104 generates the ETL job outputs 124 and the data quality records 114 based on the ETL job inputs 122. At least in some cases, information in the data quality records 114 may be output in the form of a data quality report. To that end, the self-analyzing ETL job may access one or more schemas 158 external to and referenced by the ETL job.

For example, a hierarchical parsing job may have multiple processing steps including an input step, an XML parsing step, and an output step. In one embodiment, the input step may accept input data and send the data to the XML parsing step. The XML parsing step may generate streaming events based on the output from the input step and parse the XML data based on the streaming events. The XML parsing step may then send the parsing results to the output step. The output step may map the parsing results to an output format desired by the user.

As another example, a hierarchical data composing job may have multiple processing steps including an input step, a join step, an XML composing step, and an output step. In one embodiment, the input step may accept input data and send the data to the join step. The join step may perform a desired join operation on the data and send the joined results to the XML composing step. The composing step may generate XML data based on the input data and the joined results from the join step. The output step may map the composing step results, the join step results, and the input data to an output format desired by the user.

At least in some embodiments, an ETL job may have multiple data inputs or outputs and may contain multiple processing steps, each of which may accept input to the job or from other processing steps. Further, each processing step may specify an input schema describing the input of the respective processing step, and an output schema describing an output of the respective processing step. A processing step may have multiple input schemas and multiple output schemas. Further, each processing step may perform a desired data transformation task implemented by the respective processing step. In some embodiments, each processing step further specifies quality metrics desired to be measured at the respective processing step. Further, the state machine generated for a given processing step specifies how the given processing step processes the inputs based on the input schemas and generates the outputs based on the output schemas.

In one embodiment, when a processing step identifies a data quality issue that pertains to the desired quality metrics, the processing step is configured to generate a data quality record characterizing the data quality issue. In some embodiments, the data quality record may include the violation error and related schema information. The processing step may also identify contributing factors to the data quality issue, such as input data fields, other transformation steps, or job design artifacts or components. At least in some embodiments, the contributing factors are identified based on data lineage information generated by a data lineage self-analysis by the ETL job. The data lineage self-analysis is performed to analyze job elements such as data, schemas and steps, in order to establish relationships therebetween. By configuring the self-analyzing ETL job to include the contributing factors as part of the data quality records, users may more readily identify and fix the root cause of a given data quality issue at least in some cases.

Figure 2:
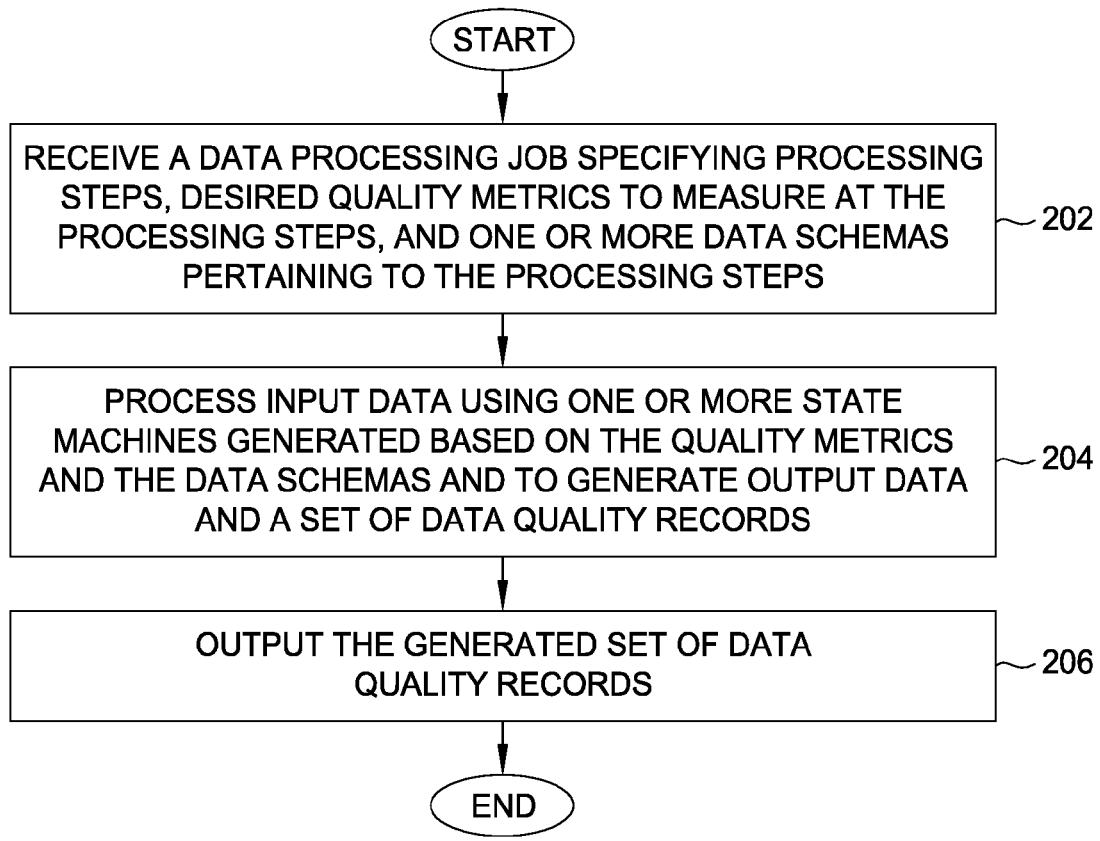
FIG. 2 is a flowchart depicting a method to determine data quality issues in data processing jobs, according to one embodiment presented in this disclosure.

FIG. 2 is a flowchart depicting a method 200 to determine data quality issues in data processing jobs, according to one embodiment presented in this disclosure. As shown, the method 200 begins at step 202, where the ETL engine 103 receives a data processing job 104 specifying processing steps, desired quality metrics to be measured at the processing steps, and one or more data schemas pertaining to the processing steps. At step 204, the ETL engine 103 executes the data processing job 104, and the data processing job 104 processes input data using one or more state machines generated based on the quality metrics and the data schemas, in order to generate a set of data quality records. At step 206, the data processing job 104 outputs the generated set of data quality records. The set of data quality records may be output to a requesting entity from which the data processing job is received, such as the user designing the data processing job. After the step 206, the method 200 terminates.

Figure 3:
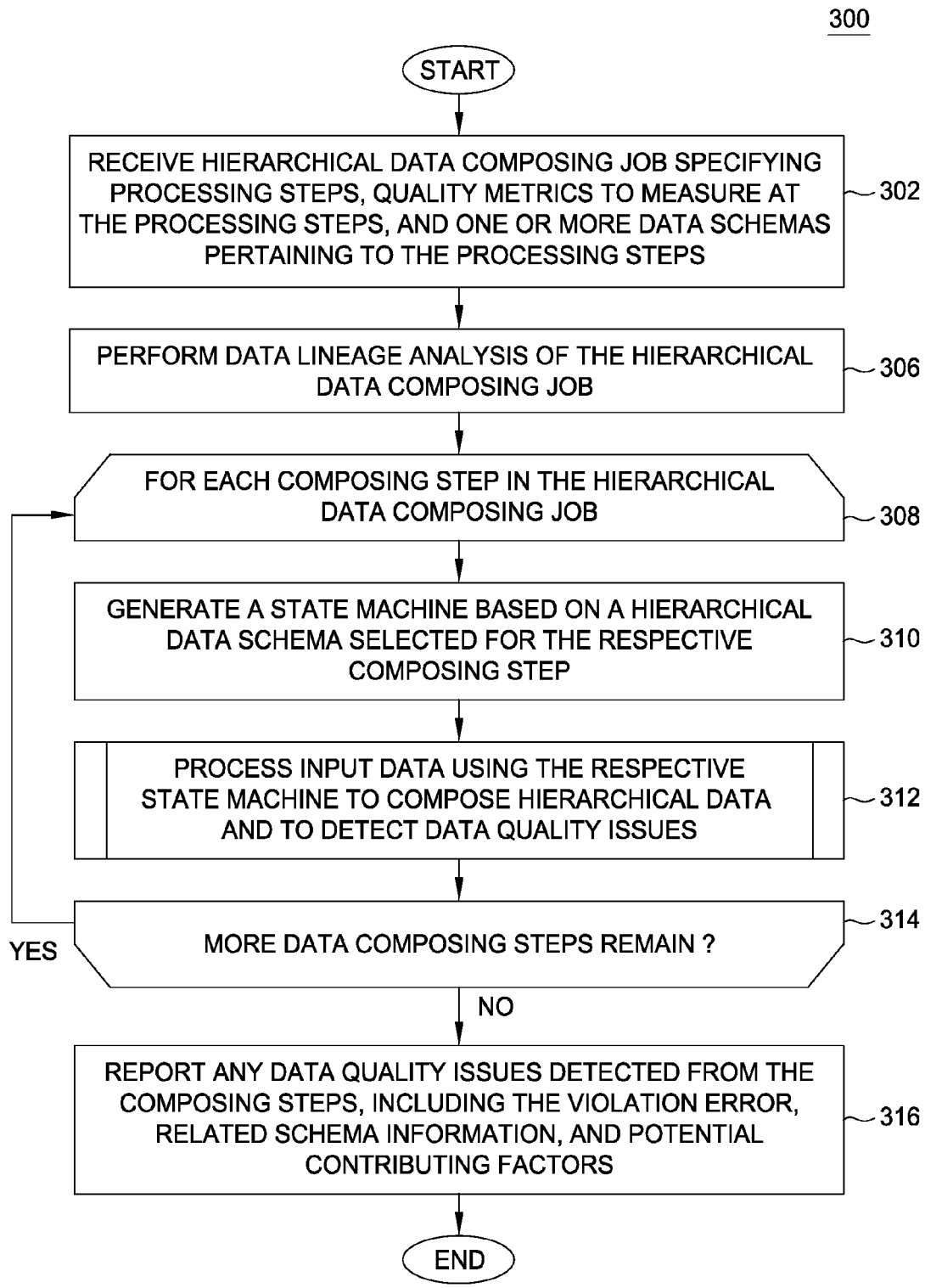
FIG. 3 is a flowchart depicting a method to determine data quality issues in hierarchical data composing jobs, according to one embodiment presented in this disclosure.

FIG. 3 is a flowchart depicting a method 300 to determine data quality issues in hierarchical data composing jobs, according to one embodiment presented in this disclosure. The method 300 corresponds to steps 202-206 of FIG. 2. At least in some embodiments, a hierarchical data composing job includes multiple steps that each processes data from multiple inputs. For example, the hierarchical data composing job may involve joining and regrouping the data from the multiple inputs to create hierarchical data. The hierarchical data composing job may use one or more composer steps to generate the hierarchical data according to a predefined schema.

Assume a user is creating and using a data processing job, such as an ETL job, to compose hierarchical data from multiple inputs. The hierarchical data may be represented in a predefined schema. Depending on the embodiment, the schema may be an industry standard or may be a custom schema defined by the user. When executed by the ETL engine 103, the data processing job composes the hierarchical data based on the inputs and the schema. The data processing job in such scenarios may be considered as a hierarchical data composing job.

In one embodiment, when configured according to the techniques disclosed herein, the data processing job, when executed by the ETL engine 103, triggers a reporting, to the user, of any data quality issues identified during the composing process. Further, in some embodiments, contributing factors are also identified. For example, source data, transformation steps and ETL design aspects potentially pertaining to each data quality issue may be identified and reported to the user. Armed with this information, the user may correct the identified factors in the data processing job, such that the data processing job may correctly compose the hierarchical data during a subsequent execution by the ETL engine 103.

As shown, the method 300 begins at step 302, where the ETL engine 103 receives the hierarchical data composing job. In some embodiments, the hierarchical data composing job is designed by a user via the ETL job design tool 101. The hierarchical data composing job may specify processing steps, quality metrics desired to be measured at the processing steps, and one or more data schemas pertaining to the processing steps. For example, the quality metrics may specify to detect errors such as one or more of ill-formed markup language error, unknown structure error, data value error, data type mismatch, null value constraint violation, pattern matching violation, string length violation, uniqueness constraint violation, key constraint violation, and key reference constraint violation. The errors may also be referred to as violations.

In some embodiments, the quality metrics may be categorized into multiple groups. For example, the multiple groups may include one or more of structure errors, data errors, facet violation, and identity constraint violations. Structure errors may include ill-formed markup language and unknown structure errors. Data errors may include data value errors and data type mismatch errors. Facet violation errors may include pattern matching violations and strength length violations. Identity constraint violations include uniqueness constraint violations, key constraint violations, and key reference constraint violations. The errors, groups, and membership therein may be tailored to suit the needs of a particular use case depending on user requirements.

At step 306, the hierarchical data composing job, when executed by the ETL engine 103, performs data lineage analysis on itself. The data lineage analysis may be performed based on one or more of: (i) the transformation steps used in the hierarchical data composing job and (ii) the data mappings defined in each transformation step. In some embodiments, as a result of performing the data lineage analysis, the hierarchical data composing job generates data lineage information pertaining to the hierarchical data composing job. In some embodiments, the data lineage information specifies one or more of data sources, data fields, transformation steps, and mappings pertaining to elements and types described by the hierarchical data schema.

At step 308, the hierarchical data composing job enters a loop to process each composing step in the hierarchical data composing job. At step 310, the hierarchical data composing job generates a state machine for the respective composer step, based on hierarchical data schemas selected for the respective composer step. At step 312, the hierarchical data composing job processes input data, such as incoming streaming or non-streaming events, using the respective state machine to compose hierarchical data and to detect data quality issues. In one embodiment, the nodes in the state machine may represent the various XML elements or attributes or its derivations in data schemas, and the state machine transitions from one node to another node based on the incoming XML event. The step 312 is described in further detail below in conjunction with FIG. 5. At step 314, the hierarchical data composing job determines whether any additional data composing steps still need to be processed. If so, the hierarchical data composing job returns to the step 308 to process a next data composing step in the loop. Otherwise, the hierarchical data composing job report all data quality issues detected from processing the composing steps (step 316).

In some embodiments, at the step 316, what is reported includes, for each data quality issue, the violation error and related schema information. What is reported may also include indication of potential contributing factors determined based on the data lineage information generated from performing data lineage analysis. For instance, the potential contributing factors may include input data fields, transformation steps, or job components that may cause the violation error. After the step 316, the method 300 terminates. In another embodiment, the steps 308, 310, 312, 314 may be executed in parallel using multiple processes or multiple computing threads. In one embodiment, each process or thread processes a single one of the steps 308, 310, 312, 314.

Figure 4:
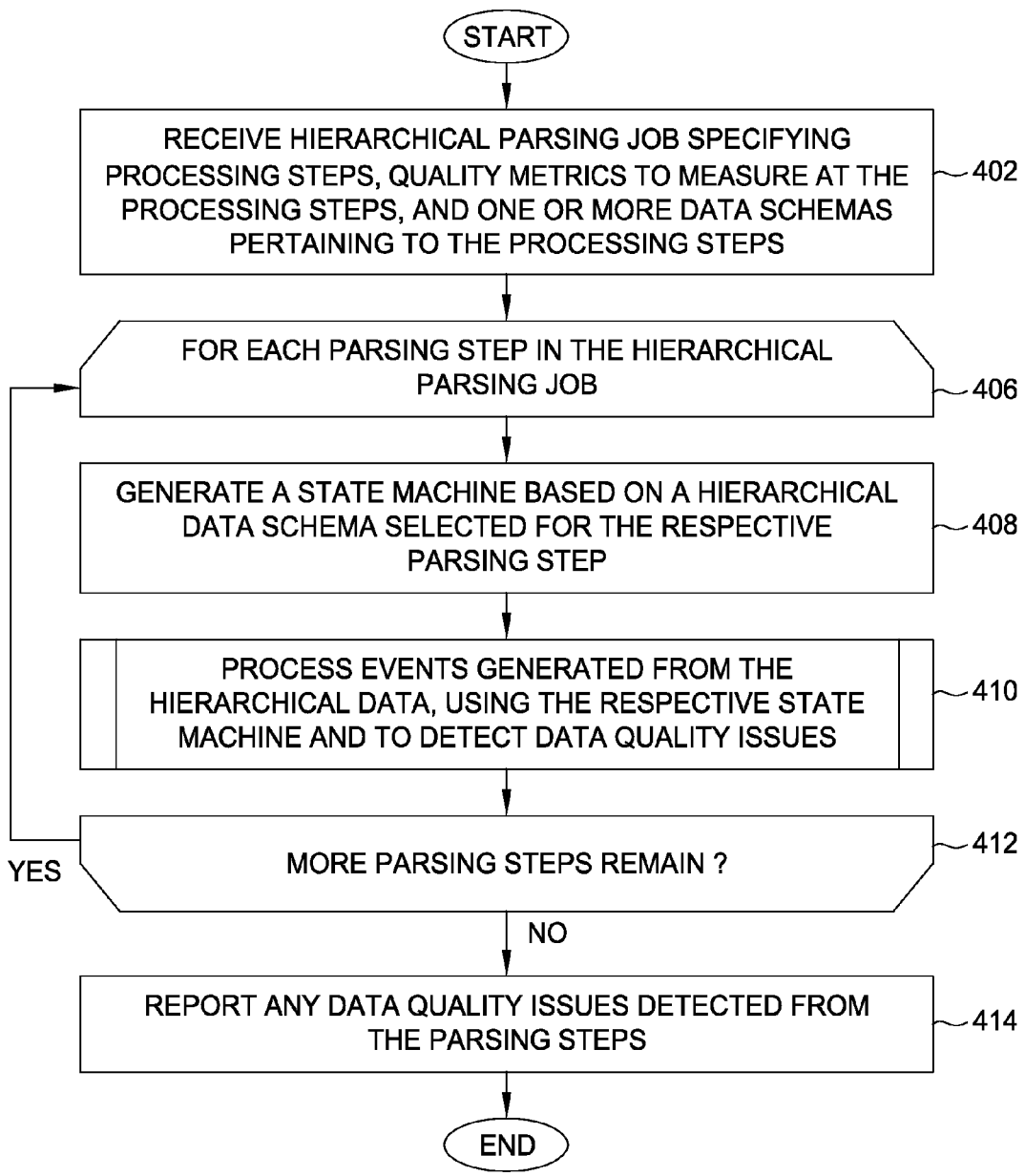
FIG. 4 is a flowchart depicting a method to determine data quality issues in hierarchical parsing jobs, according to one embodiment presented in this disclosure.

FIG. 4 is a flowchart depicting a method 400 to determine data quality issues in hierarchical parsing jobs, according to one embodiment presented in this disclosure. The method 400 also corresponds to steps 202-206 of FIG. 2. At least in some embodiments, a hierarchical parsing job includes multiple steps that each parses incoming hierarchical data from earlier steps. In some embodiments, each step is configured to parse a respective portion of the hierarchical data.

Assume a user is configuring a data processing job, such as an ETL job, to parse hierarchical data received from business partners of the user. Suppose that the hierarchical data is XML data that confirms to a predefined schema. As stated above, depending on the embodiment, the schema may be an industry standard or may be a custom schema defined by the user. The data processing job in such scenarios may be considered as a hierarchical parsing job.

In one embodiment, when configured according to the techniques disclosed herein, the data processing job, when executed by the ETL engine 103, triggers a reporting, to the user, of any data quality issues identified in the invalid XML data during the parsing process. In some embodiments, the user may additionally develop a second ETL job to facilitate analyzing the reported data quality issues. For example, the second ETL job may be configured to aggregate the data quality issues by types and to sort the aggregated results based on respective frequencies of occurrence. The user may then supply the data quality reports to the business partners to facilitate resolving the data quality issues identified in the data processing job.

As shown, the method 400 begins at step 402, where the ETL engine 103 receives a hierarchical parsing job. As described above, in some embodiments, the hierarchical data parsing job is designed by a user via the ETL job design tool 101. The hierarchical data parsing job may specify processing steps, quality metrics desired to be measured at the processing steps, and one or more data schemas pertaining to the processing steps. Further, the quality metrics may be categorized into multiple groups. Examples of the quality metrics and groups are discussed above in conjunction with the step 302 of FIG. 3. At step 406, the hierarchical parsing job, when executed by the ETL engine 103, enters a loop to process each parsing step in the hierarchical parsing job.

At step 408, the ETL engine 103 generates a state machine for the respective parsing step, based on a hierarchical data schema selected for the respective parsing step. As stated above, in one embodiment, the nodes in the state machine may represent the various XML elements or attributes or its derivations in data schemas, and the state machine transitions from one node to another node based on the incoming XML event. At step 410, the hierarchical parsing job processes input data, such as streaming or non-streaming events generated from the hierarchical data, using the respective state machine and to detect data quality issues. The step 410 is described in further detail below in conjunction with FIG. 5. At step 412, the hierarchical parsing job determines whether any additional data parsing steps still need to be processed. If so, the hierarchical parsing job returns to the step 406 to process a next data parsing step in the loop. Otherwise, the hierarchical parsing job report all data quality issues detected from processing the parsing steps (step 414). As stated above, what is reported may include, for each data quality issue, the violation error, related schema information, and contributing factors. After the step 414, the method 400 terminates. As described in conjunction with the method 300, depending on the embodiment, the steps 406, 408, 410, 412, 414 may be executed in parallel using multiple processes or multiple computing threads.

Figure 5:
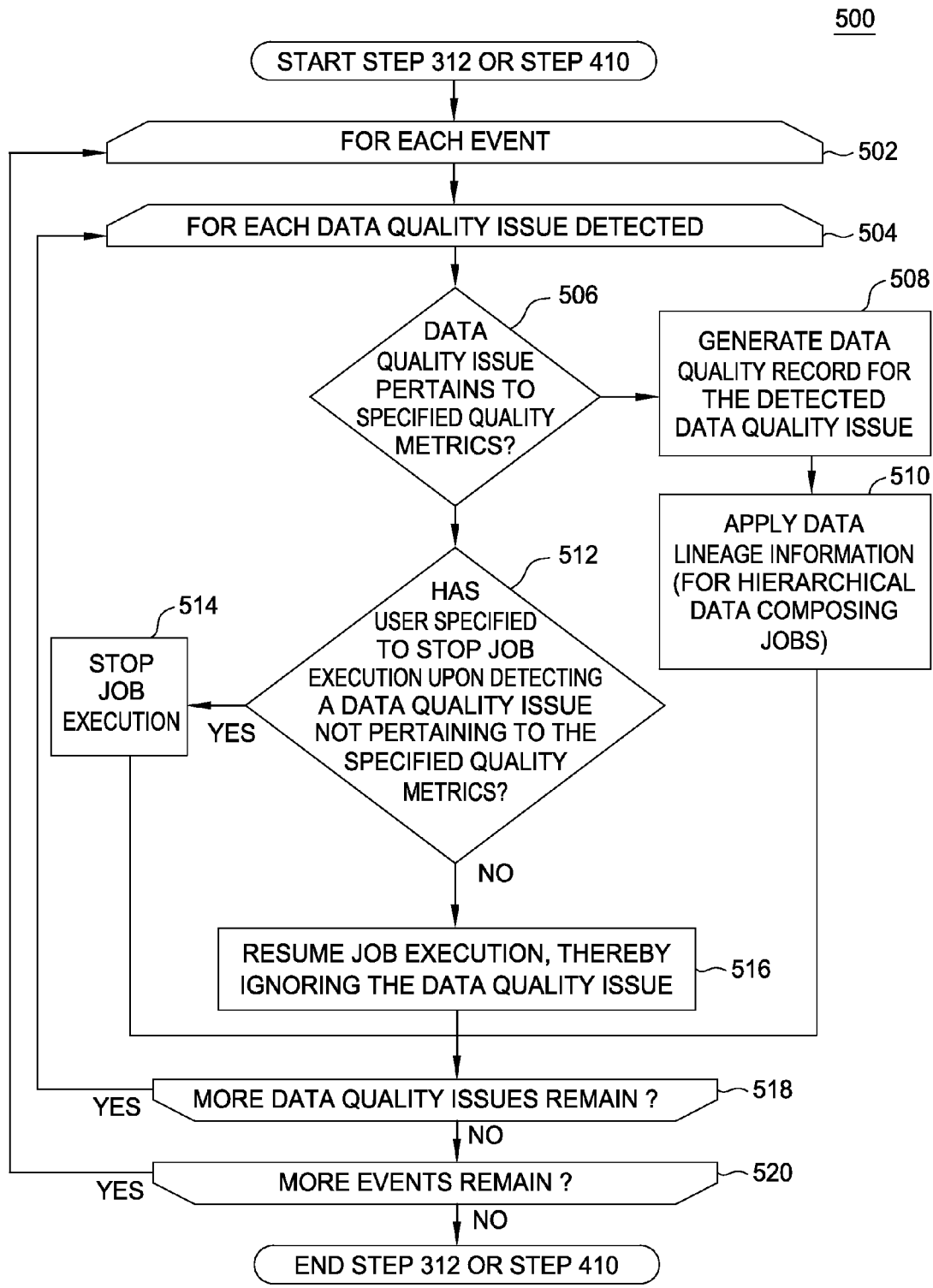
FIG. 5 is a flowchart depicting a method to process input data using a state machine in order to detect data quality issues, according to one embodiment presented in this disclosure.

FIG. 5 is a flowchart depicting a method 500 to process events using a state machine in order to detect data quality issues, according to one embodiment presented in this disclosure. The method 500 corresponds to the step 312 of FIG. 3 or step 410 of FIG. 4. As shown, the method 500 begins at step 502, where the data processing job enters an outer loop to process each event received at a given composing or parsing step and from earlier steps in the data processing job. At step 504, the data processing job enters an inner loop to process each data quality issue that is detected. At step 506, the data processing job determines whether the detected data quality issue pertains to the quality metrics specified at the given processing step. If so, the data processing job generates a data quality record for the detected data quality issue (step 508).

In some embodiments, the data quality record identifies the data quality issue, a line number and column number of the current data value causing the issue, and a path in the schema that describes the schema element corresponding to the current data value. Additionally or alternatively, the data quality record may identify the data quality issue group. In one embodiment, each data quality issue is uniquely identified by a respective issue identifier, and each group is uniquely identified by a respective group identifier. Further still, each instance of a given data quality issue may also be uniquely identified by a respective instance identifier.

In one embodiment, if the data processing job is a hierarchical data composing job, the data processing job additionally applies the data lineage information described above (step 510). The data lineage information is applied in order to identify one or more of the input data source, input data fields, and transformation steps pertaining to the current data value. The identified information is added to the data quality record. In some embodiments, the data processing job also generates a set of test cases for the data quality issue, to further facilitate debugging the data quality issue. In one embodiment, the hierarchical data composing job may capture a snippet of input data that the job is using to compose the XML data at a time that a data violation occurs. The snippet of input data may be associated with the violation in the data quality record. Users may then use the snippet of the data to identify the exact input records containing the invalid data. In some embodiments, the data processing job may update itself based on the snippet of the input data in order to generate a test case and based on one or more predefined test creation rules. Users may debug the violation error using the generated test case.

On the other hand, if the data quality issue does not pertain to the specified quality metrics (step 506), the data processing job determines whether the execution preferences specify to stop execution upon detecting a data quality issue not pertaining to the specified quality metrics. If so, the data processing job halts execution (step 514). Otherwise, the data processing job resumes execution, thereby ignoring the data quality issue detected (step 516). In an alternative embodiment, the execution preferences may additionally specify whether to skip generating the current portion of the hierarchical data, and the data processing job may alter execution accordingly. One or more of the execution preferences may be specified by the user at a time of designing the data processing job.

In one embodiment, if the current step is a parsing step, the current parsing step may additionally be configured to perform a predefined heuristic action based on the current data quality issue and one or more predefined heuristic rules. As an example, in order to handle unrecognized structure errors, the current parsing step may skip the unrecognized structure in the input data until the current parsing step finds a structure that the state machine associated with the current parsing step is able to process.

After the steps 510, 514 or 516, the data processing job determines whether any additional data quality issues still need to be processed (step 518). If so, the data processing job returns to the step 504 to process a next data quality issue. Otherwise, the data processing job determines whether any additional events still need to be processed (step 520). If so, the data processing job returns to the step 502 to process a next event, thereby continuing to compose the hierarchical data based on the next event. Otherwise, the method 500 terminates.

Accordingly, at least some embodiments disclosed herein provide techniques to determine data quality issues in data processing jobs. In one embodiment, an application is provided that is configured to receive a data processing job specifying processing steps, desired quality metrics to measure at the processing steps, and data schemas pertaining to the processing steps. The application is further configured to process events using state machines generated based on the quality metrics and the data schemas. The application is further configured to generate and output a set of data quality records based on the processing of the input data events. Using the data quality records, end-users of the application may debug and fix data quality issues in the data processing job more efficiently and conveniently at least in some cases.

Figure 6:
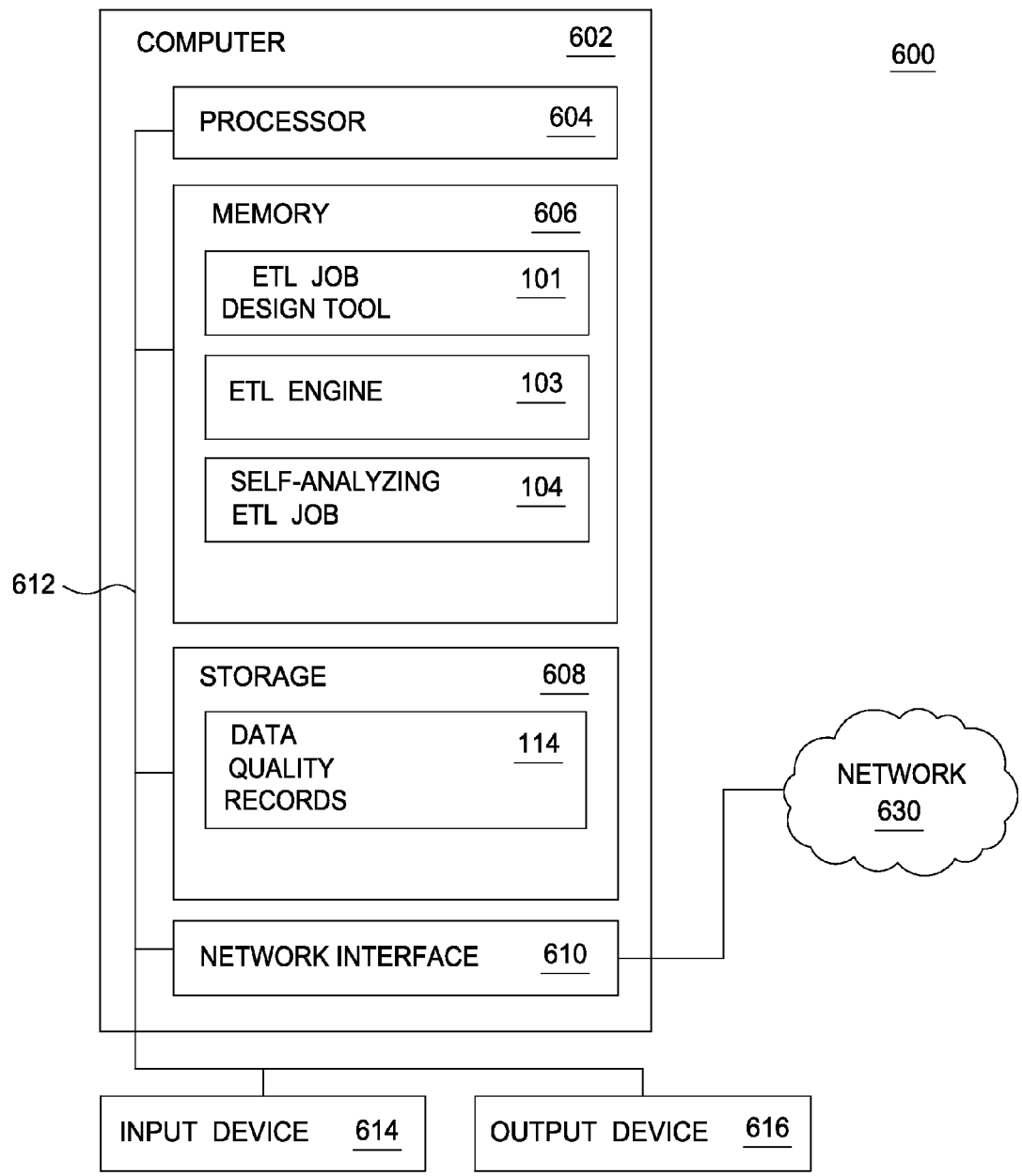
FIG. 6 is a block diagram illustrating components of a networked system to determine data quality issues in data processing jobs, according to one embodiment presented in this disclosure.

FIG. 6 is a block diagram illustrating components of a networked system 600 to determine data quality issues in data processing jobs, according to one embodiment presented in this disclosure. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 connected via a bus 612 to a memory 606, a network interface device 610, a storage 608, an input device 614, and an output device 616. The computer 602 is generally under the control of an operating system. Examples of operating systems include UNIX, versions of the Microsoft Windows® operating system, and distributions of the Linux® operating system. More generally, any operating system supporting the functions disclosed herein may be used. The processor 604 is included to be representative of a single CPU, multiple CPUs, a single CPU having multiple processing cores, and the like. Similarly, the memory 606 may be a random access memory. While the memory 606 is shown as a single identity, it should be understood that the memory 606 may comprise a plurality of modules, and that the memory 606 may exist at multiple levels, from high speed registers and caches to lower speed but larger DRAM chips. The network interface device 610 may be any type of network communications device allowing the computer 602 to communicate with other computers via the network 630.

The storage 608 may be a persistent storage device. Although the storage 608 is shown as a single unit, the storage 608 may be a combination of fixed and/or removable storage devices, such as fixed disc drives, solid state drives, floppy disc drives, tape drives, removable memory cards or optical storage. The memory 606 and the storage 608 may be part of one virtual address space spanning multiple primary and secondary storage devices.

The input device 614 may be any device for providing input to the computer 602. For example, a keyboard and/or a mouse may be used. The output device 616 may be any device for providing output to a user of the computer 602. For example, the output device 616 may be any conventional display screen or set of speakers. Although shown separately from the input device 614, the output device 616 and input device 614 may be combined. For example, a display screen with an integrated touch-screen may be used.

As shown, the memory 606 of the computer 602 includes the ETL job design tool 101, the ETL engine 103, and the self-analyzing ETL job 104, while the storage 608 of the computer 602 includes the data quality records 114. Depending on the embodiment, the data quality records may be stored in a database, as a flat file, etc. In some embodiments, the data quality records 114 are stored on a different computer connected to the computer 102 via the network 630. Further, depending on the embodiment, the ETL job design tool 101 and the ETL engine 103 (and, hence, the self-analyzing ETL job 104) may execute on the same or on different computers connected via the network 630.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, a user of an application may specify desired quality metrics and preferences when designing a given ETL job. The ETL job may then me submitted for execution in the cloud and to generate data quality records stored in the cloud. Thus, to discover data quality issues in the ETL job, the user may access the data quality records from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method to determine data quality issues in extract, transform, and load (ETL) jobs, based on quality metrics, the computer-implemented method comprising:

receiving a data processing job comprising an ETL job specifying one or more processing steps designed based on one or more data schemas including an input schema and an output schema and further specifying one or more desired quality metrics to measure at the one or more processing steps, wherein the one or more processing steps specify the input schema and the output schema and are configured to perform a desired data transformation;

providing one or more state machines generated based on the quality metrics and on the data schemas, wherein each state machine corresponds to a respective processing step and has: (i) a respective plurality of nodes representing elements of a predefined markup language and (ii) transitions between the nodes based on incoming events of the predefined markup language, wherein the one or more events are processed by an ETL engine when executing the ETL job; wherein at least a first of the one or more state machines represents at least two markup language components selected from a markup element, a markup attribute, a derived element, and a derived attribute; and during execution of the ETL job, processing input data for the ETL job by operation of one or more computer processors and using the one or more state machines, in order to generate: (i) output data from executing the ETL job and (ii) a set of data quality records characterizing a set of hierarchical data quality issues pertaining to the one or more desired quality metrics and identified during execution of the ETL job; whereafter the generated set of data quality records is output;

wherein the ETL job is configured to perform: (i) self-analysis in order to generate a measure of a quality of data generated by the one or more processing steps and (ii) data lineage analysis in order determine one or more factors potentially contributing to each data quality issue of the set of data quality issues;

wherein the ETL job is selected from: (i) a hierarchical data composing job for generating hierarchical data from a plurality of input sources and via one or more composer steps; and (ii) a hierarchical parsing job including a plurality of parsing steps to parse a plurality of portions of incoming hierarchical data.

2. The computer-implemented method of claim 1, wherein the self-analyzing ETL job is configured to independently identify each individual group of data quality issues that is selected from structure errors, data errors, facet violation, and identity constraint violations;

wherein the self-analyzing ETL job is further configured to independently identify each individual data quality issue selected from ill-formed markup language error, unknown structure error, data value error, data type mismatch, null value constraint violation, pattern matching violation, string length violation, uniqueness constraint violation, key constraint violation, and key reference constraint violation, wherein each individual data quality issue belongs to one of the individual groups of data quality issues.

3. The computer-implemented method of claim 2, wherein a respective data quality record is generated to represent each data quality issue, wherein the self-analyzing ETL job is further configured to:

perform data lineage analysis on the hierarchical data composing job, in order to generate data lineage information pertaining to the hierarchical data composing job;

identify additional information based on the generated data lineage information, wherein the additional information includes at least one of the one or more input data sources, one or more input data fields, and transformation steps pertaining to a given event of the hierarchical data composing job; and append the additional information to the set of data quality records.

4. The computer-implemented method of claim 3, wherein the self-analyzing ETL job further specifies one or more execution preferences pertaining to the self-analyzing ETL job, of which one or more execution preferences specify whether to halt execution upon detecting a data quality issue not pertaining to the one or more desired data quality metrics, wherein the self-analyzing ETL job is further configured to, upon detecting the data quality issue not pertaining to the one or more desired data quality metrics:

resume execution upon determining that the one or more execution preferences specify not to halt execution, thereby ignoring the data quality issue not pertaining to the one or more desired data quality metrics; and halt execution upon determining that the one or more execution preferences specify to halt execution.

5. The computer-implemented method of claim 4, wherein the set of data quality records further includes a set of test cases generated by the self-analyzing ETL job, wherein the set of data quality records is used to facilitate debugging and fixing the self-analyzing ETL job by one or more users, wherein the one or more users include at least one designer of the self-analyzing ETL job.

6. The computer-implemented method of claim 5, wherein the self-analyzing ETL job is debugged and fixed via an ETL job design tool, wherein the set of generated data quality records is output to a requesting entity from which the self-analyzing ETL job is received, wherein the ETL job design tool is configured to receive user input specifying the one or more execution preferences.

7. The computer-implemented method of claim 1, wherein the data processing job comprises a self-analyzing ETL job.

8. The computer-implemented method of claim 1, wherein the data processing job is configured to independently identify each individual group of data quality issues that is selected from structure errors, data errors, facet violation, and identity constraint violations.

9. The computer-implemented method of claim 1, wherein the data processing job is configured to independently identify each individual data quality issue selected from ill-formed markup language error, unknown structure error, data value error, data type mismatch, null value constraint violation, pattern matching violation, string length violation, uniqueness constraint violation, key constraint violation, and key reference constraint violation.

10. The computer-implemented method of claim 1, wherein each state machine represents at least one of Extended Markup Language (XML) elements, XML attributes, derived elements, and derived attributes.

11. The computer-implemented method of claim 1, wherein the data processing job is configured to independently generate the set of data quality records for each individual job type selected from a hierarchical data composing job and a hierarchical parsing job.

12. The computer-implemented method of claim 1, wherein the first state machines represents Extended Markup Language (XML) elements, XML attributes, derived elements, and derived attributes.

13. The computer-implemented method of claim 1, wherein the data lineage analysis on is performed in order to generate data lineage information pertaining to the data processing job, wherein additional information, including one or more input data sources, one or more input data fields, and transformation steps of the data processing job is determined based on the data lineage information and appended to the set of data quality records.

14. The computer-implemented method of claim 1, wherein the data processing job specifies one or more execution preferences, the one or more execution preferences including a first execution preference specifying whether to halt execution upon detecting a data quality issue not pertaining to the one or more desired data quality metrics.

15. The computer-implemented method of claim 1, wherein the set of data quality records further includes a set of test cases generated by the data processing job.

16. The computer-implemented method of claim 1, wherein the set of data quality records is output to a requesting entity from which the data processing job is received.

17. The computer-implemented method of claim 1, wherein the ETL job comprises the hierarchical data composing job.

18. The computer-implemented method of claim 1, wherein the ETL job comprises the hierarchical parsing job.

19. The computer-implemented method of claim 1, wherein the first state machine represents the markup element and the markup attribute.

20. The computer-implemented method of claim 1, wherein the first state machine represents the derived element and the derived attribute.

* * * * *